June 20, 1944.   E. P. TURNER   2,351,890
BALL BEARING CONSTRUCTION
Filed Dec. 16, 1942

Inventor
Edgar P. Turner

Witness:
Godfrey Pecina

By John F. Heine
Attorney

Patented June 20, 1944

2,351,890

UNITED STATES PATENT OFFICE 2,351,890

BALL-BEARING CONSTRUCTION

Edgar P. Turner, Fanwood, N. J., assignor to The Singer Manufacturing Company, Elizabeth, N. J., a corporation of New Jersey Application December 16, 1942, Serial No. 469,153

3 Claims. (Cl. 308—233)

This invention relates to ball bearing structures especially of the type combining both radial and axial loading and sometimes termed cup bearings.

Heretofore it has been common practice to employ rotatable shafts formed with conical end portions hardened and ground to a high grade surface finish, each end portion engaging a respective ring of precision bearing balls retained in a conventional ball-race. When carefully and properly made, such bearings are satisfactory. However, it has been found that precision manufacture of high order coupled with many hand inspections and check tests throughout the fabrication and assembly are necessary to insure good results. That is to say, the cone-end construction seems to be extremely critical of dimensional variations which results in high man-hour expenditure and high cost per piece as well as considerable material waste due to spoilage.

Further, it is noted that, if the plane of the ball-centers in the race is only slightly inclined from a position normal to the axis of the shaft end cone, the bearing becomes noisy and erratic in behavior. This necessity for critical positioning of parts is disadvantageous in prolonging the assembly time.

It is therefore an object of this invention to provide a bearing structure which shall require ordinary precision and care in manufacture and shall not be critical with regard to the positioning of the associated parts.

A further object of the invention is to provide a shaft bearing in which parts subject to wear shall be made readily replaceable.

With the above and other objects in view as will hereinafter appear, the invention comprises the combination and arrangement of parts hereinafter set forth and illustrated in the accompanying drawing of a specific embodiment of the invention and the advantages attained thereby will be readily understood by those skilled in the art.

In the accompanying drawing—

Fig. 3 is an end view of the bearing with the shaft removed therefrom.

Figure 1:
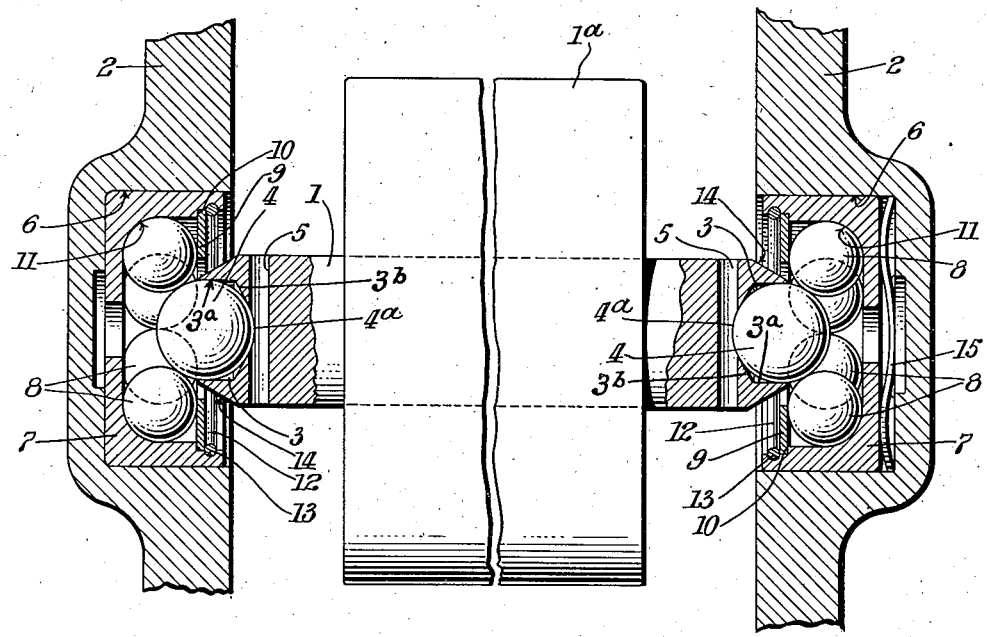
Fig. 1 is a longitudinal sectional view, partly in elevation, taken through my improved ball-bearing structure.

Referring to the drawing, a rotor shaft 1 carrying a rotor 1ᵃ is rotatably journaled in spaced bearing-supports 2. The shaft 1 is provided at each end with an axial cavity 3 having an uninterrupted cylindrical side wall 3ᵃ and a bottom-end wall 3ᵇ. Press-fitted into the cylindrical side wall 3ᵃ into engagement with the bottom-end wall 3ᵇ of the cavity 3, for rotation with the shaft 1, is a spherical steel ball 4. The axial depth of the cavity 3 is slightly greater than the radius of the ball 4 so that, when said ball is properly seated against the bottom-end wall 3ᵇ of the cavity, a segmental portion of the ball slightly smaller than a hemisphere protrudes from the end of the shaft 1.

Figure 2:
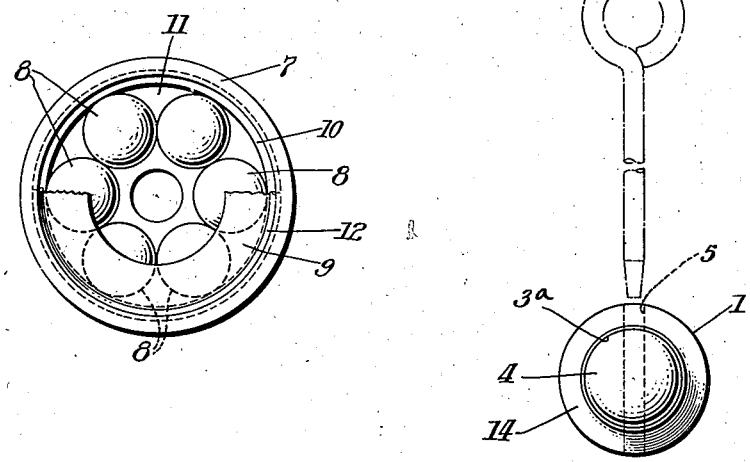
Fig. 2 is an end view of the shaft removed from the bearing.

The shaft 1 has a diametrical hole 5 which breaks through the bottom-end wall 3ᵇ of the shaft-cavity substantially axially of the shaft 1. The arrangement of parts is such that the surface 4ᵃ of the ball 4 projects within the hole 5 so that a simple rod-like tool, indicated in the dot and dash lines of Fig. 2, having a diameter slightly less than the diameter of said hole, may be pushed therewithin to wedge the ball axially out of the cavity.

Pressed into a bearing cavity 6 in each bearing support 2 is an outer race-ring 7 within which is retained a ring of steel bearing balls 8. A retainer ring 9 seated against annular shoulder 10 formed on the ring 7 retains the balls 8 within the ring but does not interfere with their free rolling contact with raceway 11 formed in the ring 7. A snap ring 12 is expanded outwardly against an inner peripheral groove 13 to hold the retainer ring 9 firmly against the shoulder 10.

The balls 8, as shown in Fig. 3, are arranged ring fashion with very small clearance between adjacent balls. This confines the balls and provides proper radial and peripheral spacing and, at the same time, permits each ball to roll independently. This nest of balls 8 receives in surface contact the single ball 4, as seen best in Fig. 1. The end portions of the shaft 1 are formed with conical surfaces 14 in order to reduce the shaft diameter in the vicinity of the nest of balls 8 to provide adequate clearance therefor. The external tapering of the ends of the shaft also provides a comparatively thin ring of metal to grip the ball under a press fit and, hence, the cylindrical surface into which the ball is press-fitted will not have to be manufactured to the high degree of dimensional accuracy which would otherwise be required to secure a press fit without undue distortion of the parts.

A spring washer 15, located axially between one of the race rings 7 and its associated bearing support 2, provides an axially resilient load for taking up any axial play in a manner generally well-known and used in bearing constructions.

It will be understood that the ball 4, seated in the shaft cavity 3, is fixed relative to the shaft 1 and rotates with it. This insures that the balls will have true rolling friction and a minimum of sliding friction. In effect, this construction provides a readily replaceable precision bearing surface for the shaft.

The construction illustrated shows the shaft ball of a larger diameter than the ring balls, but it will be understood that this invention also includes within its scope constructions wherein the shaft ball has a diameter less than or equal to that of the ring balls. The choice of the number and size of the ring balls together with the size of the shaft ball is clearly a question of the desired ratio between the axial and radial thrust and may obviously be selected to meet any requirement.

The art of manufacturing bearing balls has reached a high state of development and such balls are readily available on the market in a sufficient variety of sizes and degrees of precision and at a reasonable cost. The construction according to the invention takes full advantage of this development by providing a rolling bearing surface derived from a standard bearing ball snugly fitted into a cavity in a shaft.

By employing the insertable ball, difficult precision finishing of spherical end surfaces on the shaft is avoided. Further, in case of damage to the shaft bearing surface, whether through accident or normal wear, the defective ball may be simply replaced by a new one, whereas, in previous constructions, in which the bearing surface is formed integrally with the shaft, the entire shaft would have to be replaced.

The spherical bearing surface of the replaceable ball 4 provides a desirable circular and continuous line of rolling contact for the bearing balls 8 in all relative positions of shaft and bearing. This is to say, it is not critical that the shaft axis be positioned exactly at right angles to the plane through the centers of the balls 8 to insure substantially uniform loading of the ring balls. This is of importance in reducing the assembly time required to produce a bearing having satisfactory performance.

Resonable care must, of course, be used in forming the shaft-end cavities to make them coaxial and of the proper diameter to provide a proper press fit for the insertable balls, but the high grade bearing surface is provided, not by the shraft itself, but by resort to a separate inexpensive replaceable element which is commercially available with the desired degree of precision and grade of surface finish. These balls may be expelled and replaced without destroying the initially attained accuracy of balance of the shaft and massive rotor 1a carried thereby, which accuracy of balance is of the utmost importance in constructions in which the shaft and the rotor carried thereby are rotated at extreme high speeds of 15,000 and more revolutions per minute, as, for example, in gyroscopes.

From the foregoing description it will be perceived that I have provided a shaft bearing construction in which a single spherical ball, removably inserted within an end of a shaft, is received within a nest of balls revolubly disposed within a race-ring.

It will be obvious to those skilled in the art that the invention may, without departure from its essential attributes, be embodied in various specific forms other than that shown and described, which latter is to be considered in all respects as illustrative of the invention and not restrictive.

Having thus set forth the nature of the invention, what I claim herein is:

1. An antifriction shaft-bearing comprising, in combination, an annular raceway, a ring of bearing-balls disposed in rolling engagement with said raceway, a rotary shaft provided in an end thereof with an axial cavity having an uninterrupted cylindrical side wall and a bottom-end wall, and a spherical ball press-fitted into said cavity against the cylindrical side wall and into engagement with said bottom-end wall of the cavity for rotation with said shaft, said spherical ball having a segmental portion thereof protruding from the end of said shaft and seated centrally in said ring of bearing-balls.

2. An antifriction shaft-bearing comprising, in combination, a bearing support, a cup-shaped member carried by said bearing support providing an annular raceway, a ring of bearing-balls disposed in rolling engagement with the raceway of said member, a ball-retainer ring secured in and confining said bearing-balls in said raceway member, a rotary shaft having a conically tapered end provided with an axial cavity, said cavity having an uninterrupted cylindrical side wall and a bottom-end wall, and a spherical ball press-fitted into said cavity against the cylindrical side wall and into engagement with said bottom-end wall of the cavity for rotation with said shaft, said spherical ball having a segmental portion thereof protruding from the end of said shaft and seated centrally in said ring of bearing-balls.

3. An antifriction shaft-bearing, comprising, an annular raceway, a ring of bearing-balls disposed in rolling engagement with said raceway, a rotary shaft provided in one end thereof with an axial cavity having an uninterrupted cylindrical side wall and a bottom-end wall, said shaft having a transverse aperture breaking through said end wall, a spherical ball press-fitted into the cylindrical side wall of said cavity and extending into said aperture, said spherical ball having a segmental portion thereof protruding from the end of said shaft and seated centrally in said ring of bearing-balls.

EDGAR P. TURNER.